US007880820B2

(12) United States Patent
Yelleswarapu et al.

(10) Patent No.: US 7,880,820 B2
(45) Date of Patent: Feb. 1, 2011

(54) SYSTEMS AND METHODS OF ALL-OPTICAL FOURIER PHASE CONTRAST IMAGING USING DYE DOPED LIQUID CRYSTALS

(75) Inventors: Chandra S. Yelleswarapu, Dorchester, MA (US); Sri Rajeasekhar Kothapalli, St. Louis, MO (US); D. V. Gopal L. N. Rao, Lexington, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 12/795,974

(22) Filed: Jun. 8, 2010

(65) Prior Publication Data
US 2010/0245694 A1    Sep. 30, 2010

Related U.S. Application Data

(62) Division of application No. 11/935,910, filed on Nov. 6, 2007, now Pat. No. 7,738,047.

(60) Provisional application No. 60/856,972, filed on Nov. 6, 2006.

(51) Int. Cl.
*G02F 1/1335*    (2006.01)
(52) U.S. Cl. .......................................................... 349/18
(58) Field of Classification Search .................... 349/18
See application file for complete search history.

(56) References Cited
U.S. PATENT DOCUMENTS 4,213,036 A *  7/1980  Kopp et al. .................. 382/133
5,426,521 A *  6/1995  Chen et al. ...................... 359/9
5,663,832 A *  9/1997  Miller et al. ................. 359/559
6,040,889 A *  3/2000  Takatori et al. .............. 349/174
7,738,047 B2 *  6/2010  Yelleswarapu et al. ........... 349/1

* cited by examiner

Primary Examiner—David Nelms
Assistant Examiner—Mary A El Shammaa
(74) Attorney, Agent, or Firm—Wilmer Cutler Pickering Hale & Dorr LLP.

(57) ABSTRACT

An assembly for converting a microscope into a phase contrast microscope includes a first optical Fourier element that Fourier transforms light from a coherent light source, a cell in the Fourier plane arranged to receive light from the first optical Fourier element, a second optical Fourier element arranged to receive light from the cell and inversely Fourier transform the received light to provide an image, an image sensor that detects the image and generates an electronic representation of the image, and an adaptor capable of coupling the first and second Fourier elements, the cell, and the image sensor to the microscope such that the first Fourier element Fourier transforms light collected by the microscope objective. The cell includes liquid crystal molecules having a phase transition temperature, wherein at temperatures exceeding the phase transition temperature, light transmitting through the liquid crystal molecules obtains a different phase than light transmitting through the liquid crystal molecules at temperatures below the phase transition temperature.

39 Claims, 9 Drawing Sheets

SYSTEMS AND METHODS OF ALL-OPTICAL FOURIER PHASE CONTRAST IMAGING USING DYE DOPED LIQUID CRYSTALS

CROSS REFERENCE TO RELATED APPLICATIONS

This application is a divisional of and claims the benefit under 35 U.S.C. §121 of U.S. patent application Ser. No. 11/935,910, filed Nov. 6, 2007 and entitled "Systems and Methods of All-Optical Fourier Phase Contrast Imaging Using Dye Doped Liquid Crystals," which claims the benefit under 35 U.S.C. §119(e) of U.S. Provisional Application No. 60/856,972, filed Nov. 6, 2006 and entitled "Phase Contrast Imaging Using Dye Doped Liquid Crystals," the entire contents of both applications are incorporated herein by reference.

STATEMENT REGARDING FEDERALLY SPONSORED RESEARCH OR DEVELOPMENT

This research is supported in part by a BAA contract W911QY-04-C-0063 from U.S. Army Natick Soldier Center.

BACKGROUND

1. Field

The disclosed subject matter generally relates to phase contrast imaging, e.g., phase contrast microscopy.

2. Discussion of Related Art

Translucent objects or phase objects can alter only the phase of the optical wave, not its amplitude. Hence, these objects are very difficult to see with the naked eye and cannot be captured by an ordinary camera. A phase contrast microscope can be used to obtain high-contrast images of transparent specimens, such as living cells (usually in culture), microorganisms, thin tissue slices, lithographic patterns, fibers, latex dispersions, glass fragments, and subcellular particles (including nuclei and other organelles). One useful feature of a phase contrast microscope is that living cells can be examined in their natural state without being fixed, and/or stained. As a result, the dynamics of ongoing biological processes can be observed and recorded in high contrast with sharp clarity of minute specimen details.

In 1933, Zernike developed a non-destructive mechanism based on the principle of phase contrast to observe translucent microscopic objects. It is a two step process: (1) separation of deviated and undeviated components in the light transmitted through the specimen with a $\pi/2$ phase difference between them and (2) obtaining an additional $\pi/2$ phase separation thereby converting phase information into amplitude (intensity) contrast for display. If the undeviated light is phase shifted by $\pi/2$, then the undeviated and diffracted light arriving at the eyepiece would produce destructive interference and the object details appear dark in lighter background. This is known as dark or positive phase contrast. If, however, the undeviated light is phase shifted by $-\pi/2$ then the diffracted and undeviated light beams interfere constructively. This produces a bright image of the details of the specimen in dark background and is known as negative or bright contrast. This principle is exploited for the phase contrast microscope.

Existing phase contrast microscopes employ a tungsten-halogen lamp as a light source and a condenser annulus for separation of the deviated and undeviated light. They also use phase plates for generating the additional phase retardation between undeviated light and light diffracted by the object, thereby transforming minute variations in phase of the object into corresponding changes in image contrast. The collimated light passes through the condenser plate which typically contains several transparent annular rings (carefully positioned and designed to be an optical conjugate to a phase plate residing in the image plane) and is focused onto the specimen. The light transmitted by the specimen consists of undeviated light and diffracted light. The undeviated and diffracted light differs in phase by $\pi/2$ due to the inherent phase variations in the specimen. The light is then collected by the objective and is spatially separated at its back focal plane. A phase plate selectively placed at this back focal plane introduces an additional $\pi/2$ relative phase difference. Thus the undeviated and diffracted light interferes destructively so that the phase variations in the specimen appear bright against a dark background. Two types of phase plates, positive and negative, are available to produce a bright image in dark background or vice versa.

However, there are some unavoidable disadvantages associated with the use of these plates:

1. Halo and shade-off contrast patterns are frequently observed in phase contrast images. These observed intensity patterns do not directly correspond to the optical path difference between the specimen and the surrounding medium. The artifacts depend on both the geometrical and optical properties of the phase plate and the specimen being examined. In particular, the width and transmittance of the phase plate material play a critical role in controlling these effects. In addition, these effects are heavily influenced by the objective magnification. Apodized phase plates are used for reducing the severity of halos.
2. In order to resolve minute details and edges in the specimen, a large angle of diffracted light must be captured by the microscope objective and must be brought into a sharp focus at the image plane. The condenser aperture diaphragm opening size partially controls the coherence of the light incident on the specimen. Decreasing the opening size of the diaphragm yields greater spatial coherence but it introduces diffraction related artifacts. Thus the system is limited by the working numerical aperture of the objective thereby reducing the resolution of the instrument.
3. When the object is changed or a different magnification is desired, the bright-field image has to be obtained first and then the condenser plate has to be rotated to position the annular ring to match the new phase plate. Thus as a result of frequent rotations of the condenser plate, the annular ring tends to be out of alignment with the phase plate requiring regular maintenance of the system. Special tools are provided for adjusting the condenser plate, which require skill and experience on the part of the operator. Furthermore, rotation of the condenser plate can sometimes cause the specimen to move as it is positioned just before the condenser.

Existing phase contrast microscopes have been modified since their invention, in terms of phase plate design and detection schemes. However, conventional phase contrast microscopes do not exploit advantages that come with a coherent source. For example, the white light sources of conventional phase contrast microscopes cannot provide Fourier transformation, as a result which the object information cannot be well separated at the Fourier plane.

With the growing demand for a variety of imaging modalities that offer different distinct advantages, improved methods for imaging phase objects in transparent media and imaging phase objects in tissue-like scattering media are needed.

SUMMARY

Embodiments of the invention provide systems and methods of all-optical Fourier phase contrast imaging using dye doped liquid crystals.

Under one aspect, a phase contrast imaging system includes a coherent light source emitting a coherent beam, the beam being directed toward a sample area; a lens arranged to collect at least part of the beam from the sample area; a first optical Fourier element that Fourier transforms the collected beam, wherein the Fourier transform occurs in a Fourier plane; a liquid crystal cell in the Fourier plane that transmits at least part of the transformed beam, wherein the cell includes liquid crystal molecules having a phase transition temperature, and wherein at temperatures exceeding the phase transition temperature, light transmitted through the liquid crystal molecules obtains a different phase than light transmitted through the liquid crystal molecules obtains at temperatures below the phase transition temperature; a second optical Fourier element that receives the transmitted beam and inversely Fourier transforms the transmitted beam to provide an image; an image sensor that detects the image and generates an electronic representation of the image; and an optical element configured and arranged to adjust the beam intensity to a level at which part of the transformed beam has an intensity sufficient to heat a portion of the liquid crystal molecules above the phase transition temperature.

Some embodiments include one or more of the following features. The lens includes a microscope objective. The optical element selected to adjust the beam intensity includes a neutral density filter. The first and second optical Fourier elements include lenses. The image sensor includes a CCD. A polarizer positioned between the second optical Fourier element and the image sensor, the polarizer being rotatable to a position selected to eliminate at least a part of the information about the sample area from the image. An optical element to direct at least part of the beam toward a fluorescence imaging system. At temperatures below the phase transition temperature, the liquid crystal molecules are birefringent, and wherein at temperatures above the phase transition temperature, the liquid crystal molecules are isotropic. The beam has a predominant polarization, and wherein the liquid crystal cell is oriented at about 45° to the predominant polarization. The liquid crystal cell further includes dye molecules selected to at least partially absorb the beam, and wherein at least partial absorption of the beam by a portion of the dye molecules heats the part of the liquid crystal molecules above the phase transition temperature. The phase transition temperature, the liquid crystal molecules are in an aligned nematic phase. The optical element is configured and arranged to adjust the beam intensity to a level at which a portion of the transformed beam transmits through the cell with a phase that is delayed relative to an other portion of the transformed beam by one of about $\pi/2$ and about $-\pi/2$. The portion of the transformed beam that is phase delayed corresponds to low spatial frequencies, and wherein the other portion of the transformed beam corresponds to spatial frequencies that are higher than the portion that is phase delayed and also has a lower intensity than does the portion that is phase delayed. The coherent light source includes a continuous-wave laser. The coherent light source includes a diode. The liquid crystal cell is passive, in that no voltage is applied to the cell. The optical element is further configured and arranged to adjust the beam to an intensity such that it does not damage a living organism placed in the sample area.

Under another aspect, a method of imaging an object includes generating a coherent beam; irradiating an object with the coherent beam; collecting at least a part of the beam that irradiated the object; Fourier transforming the collected beam; phase delaying a portion of the transformed beam relative to another portion of the transformed beam; inversely Fourier transforming the partially phased-delayed beam; and detecting the inversely Fourier transformed beam.

Some embodiments include one or more of the following features. Fourier transforming the collected beam includes transmitting the collected beam through a lens. Inversely Fourier transforming the partially phase-delayed beam includes transmitting the partially phase-delayed beam through a lens. Phase delaying the portion of the transformed beam relative to another portion of the transformed beam includes transmitting the transformed beam through a cell including liquid crystal molecules. The liquid crystals have a phase transition temperature, and wherein at temperatures exceeding the phase transition temperature, light transmitting through the liquid crystal molecules obtains a different phase than light transmitting through the liquid crystal molecules obtains at temperatures below the phase transition temperature. Selecting an intensity of the beam such that a portion of the transformed beam heats the liquid crystal molecules to a temperature exceeding the phase transition temperature, and another portion of the transformed beam does not heat the liquid crystal molecules to a temperature exceeding the phase transition temperature. Selecting the intensity of the beam such that the portion of the transformed beam that heats the liquid crystal molecules to a temperature exceeding the phase transition temperature accrues a phase delay of one of about $\pi/2$ and $-\pi/2$ relative to the portion of the transformed beam that does not heat the liquid crystal molecules to a temperature exceeding the phase transition temperature. Below the phase transition temperature, the liquid crystal molecules are in an aligned nematic phase. The cell further includes a dye selected to absorb a wavelength of the beam. The cell is passive in that no voltage is applied to the cell. The object includes a living organism that is not damaged by the coherent beam. Detecting the inversely Fourier transformed beam includes irradiating an imaging device with the inversely Fourier transformed beam. Displaying output of the imaging device on a display device.

Under another aspect, an assembly for converting a conventional microscope into a phase contrast microscope, wherein the conventional microscope includes a microscope objective and a specimen stage, and the microscope objective is constructed and arranged to collect light directed toward the specimen stage, includes a first optical Fourier element that Fourier transforms light, wherein the Fourier transform occurs in a Fourier plane; a cell in the Fourier plane, wherein the cell includes liquid crystal molecules having a phase transition temperature, and wherein at temperatures exceeding the phase transition temperature, light transmitting through the liquid crystal molecules obtains a different phase than light transmitting through the liquid crystal molecules obtains at temperatures below the phase transition temperature; a second optical Fourier element that receives the transmitted beam and inversely Fourier transforms the transmitted beam to provide an image; an image sensor that detects the image and generates an electronic representation of the image; and an adaptor capable of coupling the first and second Fourier elements, the cell, and the image sensor to the conventional microscope such that the first Fourier element Fourier transforms light collected by the microscope objective.

DETAILED DESCRIPTION

Figure 1A:
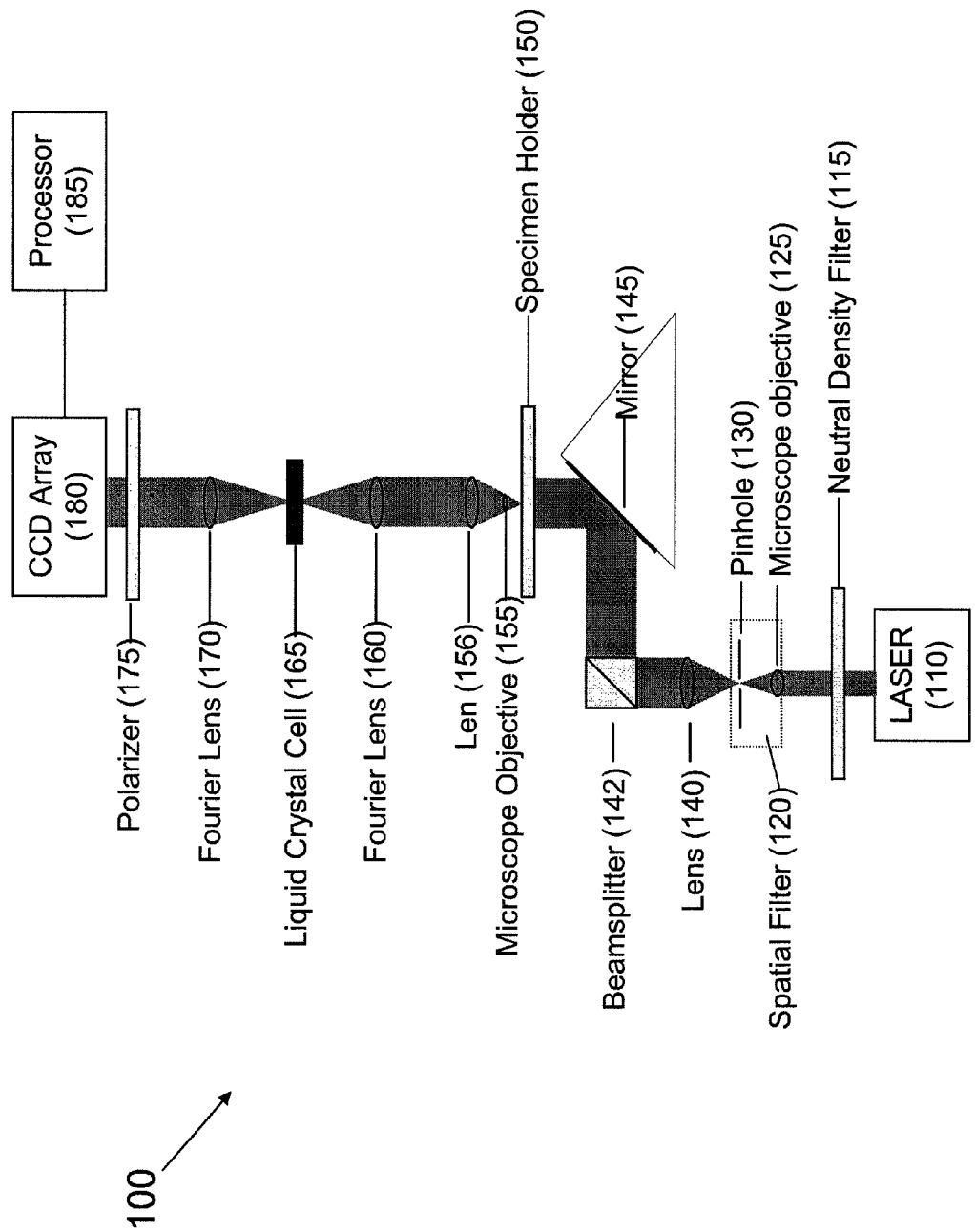
FIG. 1A is a schematic illustration of a Fourier phase contrast imaging system, according to some embodiments of the invention.

Embodiments of the invention are directed to systems and methods of all-optical Fourier phase contrast imaging using a low power coherent source (laser) and dye-doped liquid crystals. In general, the Fourier spectrum of an object contains low spatial frequencies at the center of the spectrum, with high intensities, while high spatial frequencies are on the edges, with lower intensities. The laser source provides precise separation of these frequency regimes through an all-optical Fourier transform. In some embodiments, high monochromaticity of the coherent source facilitates a well defined Fourier plane in which different spatial frequency bands are clearly resolved. In addition the intensity of the laser source makes object features bright and clearly visible. Some embodiments provide bright-field, positive phase contrast and negative phase contrast images of "phase objects," i.e., objects that are at least partially optically transparent and thus are difficult to image using conventional amplitude-based imaging such as, for example, ordinary bright-field microscopes and photographs. Specifically, different regions of a phase object have different optical characteristics, for example, have different indices of refraction and/or different thicknesses, which diffract, refract, and/or impart phase changes onto coherent light passing through the object relative to light that does not pass through the object. The difference in phase between light that passes through the object, and that does not pass through the object, is manipulated using a dye-doped liquid crystal cell in the Fourier plane of the object, as described in greater detail below. The resulting phase difference is used to generate a phase contrast image of the object. While conventional phase contrast microscopy uses a white-light source and a phase plate (fixed in the amount of phase retardation it can induce and diameter), the systems and methods described herein are robust and "self-adaptive," that is, readily provide images regardless of changes in the shape, size and magnitude of phase variations of phase objects. The systems and methods are also relatively user-friendly, allowing the contrast of images of a phase object to be modified by simply changing the intensity of the light that impinges the sample. As illustrated below, the systems and methods can be used to produce high-quality phase contrast images of a phase object (even in a scattering medium). For example, the shape of micro organisms can be clearly displayed and quantitative information such as the dimensions of the objects can be obtained.

In many embodiments, coherent light waves that are in phase with one another are directed in phase onto an at least partially transparent object. Some of the light waves accumulate a phase shift as they pass through the object, while light waves that do not pass through the object do not accumulate a phase shift. The light is then Fourier transformed using a lens or microscope objective, and a cell containing dye-doped liquid crystals is placed at the resulting Fourier plane. The dye in the cell at least partially absorbs the light, and the resulting temperature increase causes an intensity-dependent, liquid-crystal phase transition within the cell. The spatial profile of the temperature increase corresponds to the spatially-varying intensity of the Fourier transform of the object. In some regions of the liquid crystal, the light intensity (and concomitant temperature increase) is sufficiently high to cause the liquid crystal molecules in those regions to change phase, for example, to an isotropic phase. In other regions of the liquid crystal, the light intensity is insufficiently high to cause the liquid crystal molecules in those regions to change phase. The particular phase of the liquid crystal modifies the phase of the light passing through the cell. The phase of the liquid crystal (and concomitant relative phase shift of different regions of the Fourier transform of the light) can be modified by adjusting the amplitude of the light with which the sample is irradiated.

A phase-contrast image of the object is then obtained by detecting phase differences between the high and low spatial frequencies, e.g., by interfering the high and low spatial frequencies with each other. In some embodiments, this is done by inversely Fourier-transforming the light transmitted by the cell, and then imaging the light onto a CCD array. At the CCD (i.e., in the image plane of the light), the different spatial frequencies of the light interfere with one another, generating an amplitude image of the object that is based, in part, on the relative phases that the object imparts on the light, as well as on the relative phases that the liquid crystal cell imparts on the light. The contrast of the image can be modified by adjusting the amplitude of the light. In one example, the amplitude of the light is selected to generate an approximately $\pi/2$ or $-\pi/2$ phase difference between the high and low spatial frequencies.

The CCD array can be, for example, a two-dimensional array of detectors integrated into single, compact electronic chip. The CCD array converts photons to electrons using closely spaced metal-oxide-semiconductor (MOS) diodes and thereby generates a discrete electronic representation of a received optical image. A controller/processor reads the image representation from the CCD sensor pixel-by-pixel and organizes it into a digital array. The digital array can then be output to a memory or image store. The images can be displayed on an image display, such as a cathode ray tube or another type of electronic image display.

Some embodiments include a nematic liquid crystal cell in the plane of the Fourier transform of the light, e.g., a cell containing twisted nematic liquid crystals, and an absorber or dye that is selected to at least partially absorb the wavelength of interest, and to cause a sufficient temperature increase in the liquid crystal upon irradiation to induce a phase change in the liquid crystal. Nematic liquid crystals (LC) include rod-like molecules which line up parallel to a preferred direction and hence are anisotropic. When a linearly polarized monochromatic light wave propagates through a homogeneously aligned LC cell with its polarization axis at 45° to the axis of orientation, the anisotropy property of the liquid crystal adds a certain amount of phase to the transmitting beam. This phase is attributed to the refractive index differences of the ordinary and extraordinary rays.

Relatively high intensity regions of the Fourier transform of the light, e.g., low spatial frequencies at the center of the Fourier spectrum, are intense enough to cause molecules in those regions to undergo a transition from nematic or anisotropic phase to isotropic phase. Lower intensity regions of the Fourier transform of the light, e.g., high spatial frequencies near the edges of the Fourier spectrum, are not sufficiently intense to induce a phase transition, and molecules in these regions remain in an anisotropic phase. Aligned liquid crystal molecules (molecules that are in anisotropic or nematic phase) add a certain amount of phase to the incident light wave as it passes through, whereas isotropic liquid crystals substantially do not add additional phase to the transmitted beam. Thus the high intensity, low spatial frequency light will transmit through the self-induced isotropic phase of liquid crystal cell without accumulating phase change, while the low intensity, high spatial frequency light will acquire a phase change relative to the high intensity light as it transmits through the liquid crystal phase (anisotropic phase) of the liquid crystal cell. This leads to a relative phase difference between these two spatial frequency regions, which is then used to generate a phase contrast image. Usefully, the phase difference is on the order of about $\pi/2$ or $-\pi/2$, which generates images of high contrast. However, other phase differences also produce useful images. In many embodiments, the liquid crystal cell is passive, that is, it needs no applied voltage in order to perform its function.

The relative phase retardation experience by light transmitting through the cell is expressed by $\Gamma=\pi\Delta nd/\lambda$, where d is the cell thickness, $\lambda$ is the wavelength, and $\Delta n=(n_e-n_o)$ is the induced birefringence. As the temperature of the liquid crystal increases, the ordinary refractive index ($n_o$) increases while the extraordinary refractive index ($n_e$) decreases. Thus, the birefringence decreases with increasing temperature and vanishes when the liquid crystal molecules undergo phase transition, liquid crystal phase to isotropic phase. At low light input intensities, the temperature of the liquid crystal is well below its phase transition temperature $T_c$. Thus, a phase, e.g., of 90°, is added to the transmitted beam because of the large birefringence $\Delta n$ in the liquid crystal phase. When the incident light intensity increases, the temperature of the liquid crystal increases owing to the absorption by dye molecules. At temperatures exceeding the phase transition temperature of the liquid crystals ($T \geq T_c$) there is no birefringence and hence light transmitting through those crystals experiences no phase retardation. This results in the increase of ordinary refractive index ($n_o$) and decrease in the extraordinary refractive index ($n_e$). For $T \geq T_c, n_o=n_e$ and the induced birefringence $\Delta n$ vanishes. Hence no additional phase is added to the transmitted beam. Therefore, if two light beams of different intensity are incident simultaneously at different spatial locations on the liquid crystal, the local liquid crystal molecules undergo respective intensity-dependent, liquid-crystal phase transitions. This leads to a relative phase difference, e.g., of $\pi/2$, $-\pi/2$, or some other value, between these two light beams at the exit plane of liquid crystal cell, depending on the intensities of the beams.

FIG. 1A schematically illustrates an all-optical Fourier phase-contrast imaging system, according to some embodiments. Laser 110 generates a laser beam with which a phase object is to be irradiated, e.g., a CW beam from an Ar—Kr laser with a wavelength centered at 480 nm. In general, the laser wavelength is selected such that the dye in the liquid crystal cell can at least partially absorb the light, and the resulting temperature rise sufficient to induce a phase transition within some of the liquid crystal molecules. Neutral density filter 115 adjusts the intensity of the generated laser beam, e.g., in response to user input, in order to adjust the relative phase of the different spatial frequencies of light in an image of an object being imaged by the system. Spatial filter 120 includes a pinhole 130 at the focal plane of a microscope objective 125. Spatial filter 120 spatially filters the laser beam in order to provide a clean, expanded Gaussian profile, and to remove random fluctuations from the intensity profile of the laser beam, thereby improving the resolution of the imaging system. Other types of spatial filters can also be used, such as, for example, diffractive optical elements, beam shapers, and fiber illuminators etc. Lens 140 then collimates the spatially filtered light. As discussed in greater detail below, beamsplitter 142 and mirror 145 are optional, and can be used in systems having additional functionalities, such as epifluorescence imaging, as described in greater detail below. The filtered light is then directed by beamsplitter 142 and mirror 145 onto specimen holder 150, which holds the object of interest.

A microscope objective 155, e.g., a 10× microscope objective, collects the light transmitted by the object as well as light that did not pass through the object. The magnification of the image of the object is related, in part, to the numerical aperture (NA) of the microscope objective 155, which is defined by the half-angle of the cone of light that the objective can collect and the index of refraction of the medium between the object of interest and the objective. In general, the higher the NA of the microscope objective 155, the larger the cone of collected light, and thus the more magnified and higher resolution image of the object can be obtained. Microscope objective 155 is optionally mounted on a motorized x-y-z translation stage. The light transmitted by the microscope objective 155 is then collimated using a lens (156).

Fourier lens 160, e.g., a bi-convex lens, then performs a Fourier transform of the light collimated by lens 156. Fourier lens 160 is placed such that the object or lens 156 is at the front focal plane of the lens 160. A liquid crystal cell 165 is placed at the back focal plane of the lens 160. In some embodiments, e.g., embodiments having a dye-doped twisted nematic liquid crystal cell, the cell is oriented so that the incident light is polarized at 45° to the axis of orientation of the liquid crystal. As discussed in greater detail above and below, light in some regions of the Fourier transform of the light accumulate a phase delay relative to light in other regions of the Fourier transform of the light as a result of an intensity-driven phase change. Fourier lens 170 performs an inverse Fourier transformation on the light transmitted by liquid crystal cell 165, and images the light onto a CCD array 180. Fourier lens 170 is placed such that the liquid crystal cell 165 is at its front focal plane and the CCD array 180 is at its back focal plane. CCD array 180 is in communication with a processor 185 that stores (e.g., in an image store, or a computer-readable medium) or otherwise manipulates the image obtained by CCD array 180 (see above). For example, the processor 185 is in communication with a display device (not shown) on which it displays the resulting phase-contrast image of the object.

Optionally, the system includes a polarizer 175 between the Fourier lens 170 and the CCD array 180 in order to introduce a self-adaptive spatial filtering system. Specifically, undesired features of an image can be filtered out by blocking the corresponding spatial frequency components at the Fourier plane. In the embodiment of FIG. 1A, the polarization state of high spatial frequencies (e.g., regions of liquid crystal phase) is rotated while passing through the liquid crystal cell, while there is substantially no such polarization rotation for low spatial frequencies (e.g., in the isotropic region). Thus, by rotating the analyzer the desired features of interest can be selectively enhanced, e.g., in order to provide edge enhancement. Hence, for example the (edges) shape of micro organisms can be clearly displayed and even the dimensions can be obtained, e.g., using microscopic rulers.

As noted above, neutral density filter 115 is used to control the incident laser light intensity that illuminates the phase object. By adjusting the intensity of the laser light, the system illustrated in FIG. 1A can be used in either bright-field imaging mode or phase contrast imaging mode. Specifically, in bright-field imaging mode, the incident intensity is maintained below the level at which the liquid crystal phase transition occurs even for low spatial frequencies but at a level that produces a detectible image at the CCD (e.g., from about 100 μW to about 10 mW), and the CCD captures a bright-field image. In phase contrast imaging mode, the incident intensity is increased so that the relative phase of some regions of the Fourier transform can be modified by a phase transition of the liquid crystal, in order to produce a phase contrast image of the object.

Figure 1B:
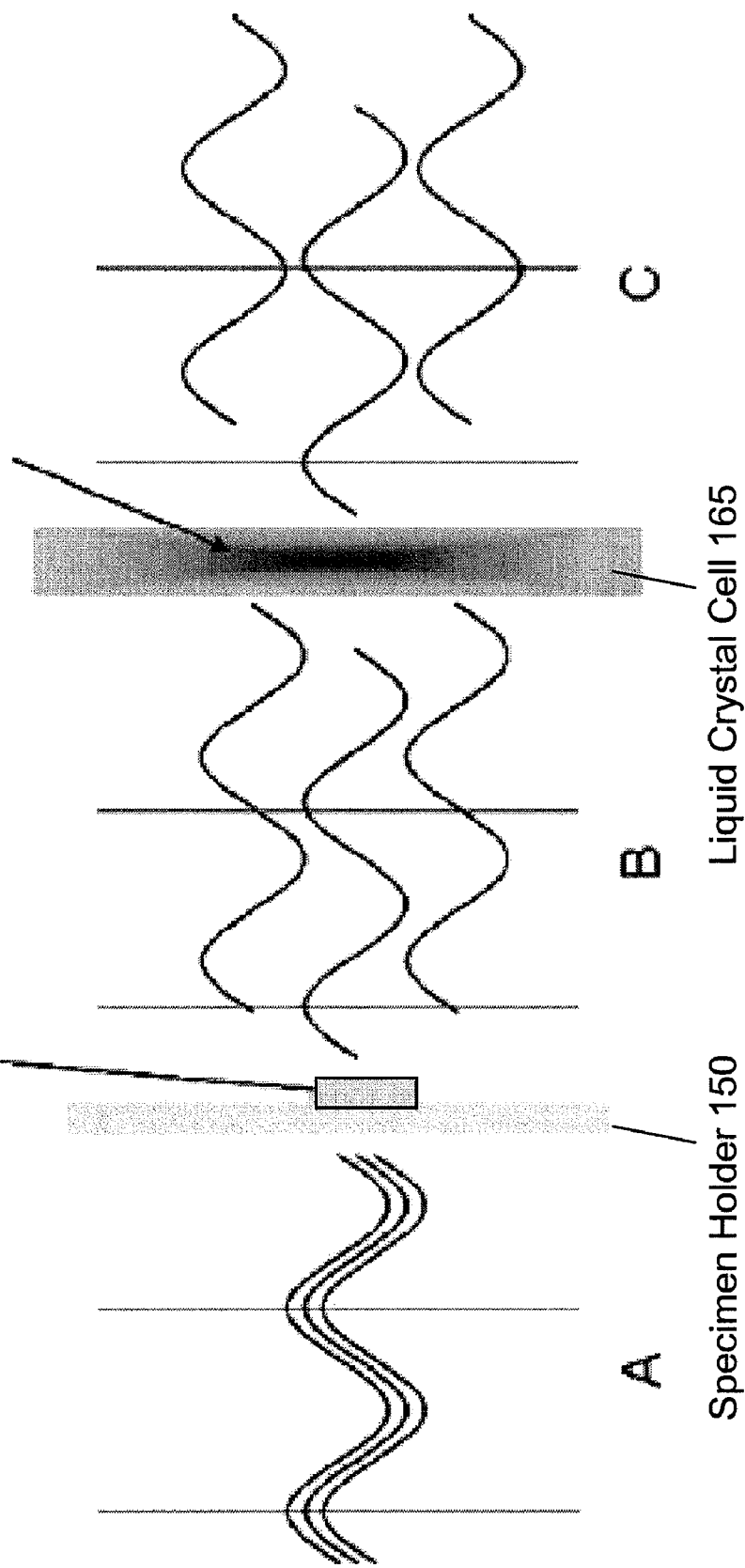
FIG. 1B schematically illustrates the mechanism of the phase delays accumulated by light transmitting through different parts of the Fourier phase contrast imaging system of FIG. 1A, according to some embodiments of the invention.

FIG. 1B schematically illustrates the relative phases of light waves as they travel through different parts of the system of FIG. 1A. Region "A" represents the waves initially transmitted by the laser. In region "A," substantially all the waves are in phase with each other. As illustrated in region "B," as the light waves pass through the object on specimen holder 150, some waves get diffracted and/or refracted because of phase gradients (refractive index differences) and accumulate a phase delay, e.g., of π/2. The undeviated waves from those portions of the specimen where there is no phase gradient substantially do not accumulate a phase delay. In the Fourier plane of these waves within liquid crystal cell 165, the undeviated light corresponds to low spatial frequencies situated in the center of the Fourier spectrum, and the deviated light corresponds to high spatial frequencies nearer the edges of the Fourier spectrum. The low spatial frequencies at the center of the Fourier spectrum have sufficient intensity to induce a phase change in the liquid crystal cell. In a nematic liquid crystal cell, the low spatial frequencies are thus located in a region having isotropic phase, which does not have birefringence, and the high spatial frequencies near the edges of the Fourier spectrum are located in a region having liquid crystal phase with associated birefringence. This causes a phase difference between high and low spatial frequencies, e.g., of π/2, which allows the CCD to obtain a phase contrast image of the object.

In one illustrative example, the liquid crystal cell included 90° twisted nematic liquid crystals. The cell walls were unidirectionally-rubbed poly(vinyl alcohol)-coated glass substrates with the two directions arranged in a crossed configuration. The substrates were used to support the polymer film and to hold the liquid crystal together. The approximately 10 μm path length cell was filled with a uniform mixture of liquid crystal 4-cyno-4'-pentyl1'-1,1'-biphenyl (K15, EM Industries, $T_c \approx 35°$ C.) and absorbing dye N-ethyl-N-(2-hydroxyethyl)-4-(4-nitrophenylazo) aniline (Disperse Red 1, from Aldrich) which has an absorption peak around 502 nm. In general, any dye concentration providing a temperature increase to cause a phase change in the liquid crystal in response to a selected laser power, while allowing the cell to transmit sufficient light to produce an image detectable at the CCD, can be used. It was observed that typical incident power required to induce a π/2 phase difference between light that passed through the sample, and light that did not, was about 3 mW.

The examples in FIGS. 2A-5C illustrate that some embodiments of systems and methods of all-optical Fourier phase-contrast imaging using dye-doped liquid crystals can be used to image biological specimens. Phase contrast images of live amoebae and paramecia include clearly identifiable nuclei and other internal organelles. The images equal the quality of images obtained with a standard phase contrast microscope and in some cases display additional features.

Figure 2C:
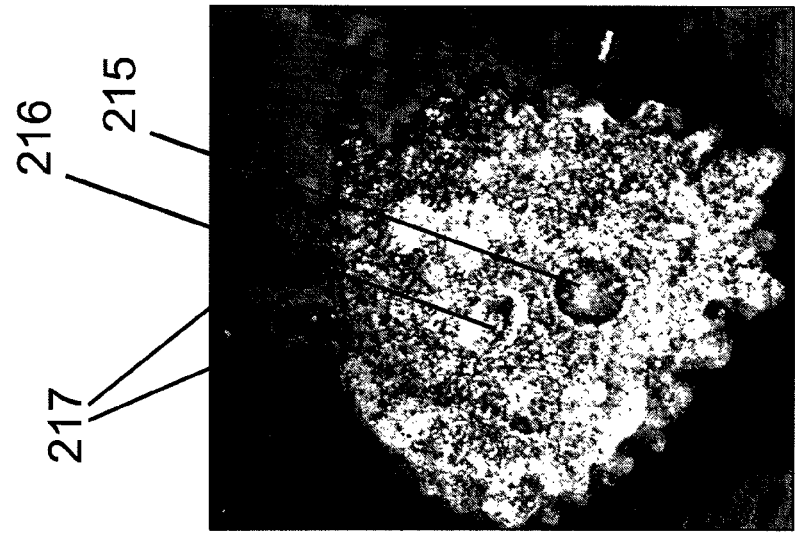
FIG. 2C is a phase contrast image of the amoeba of FIG. 2A obtained using the system of FIG. 1A in Fourier phase contrast imaging mode (with increased laser power), according to some embodiments of the invention.
Figure 2B:
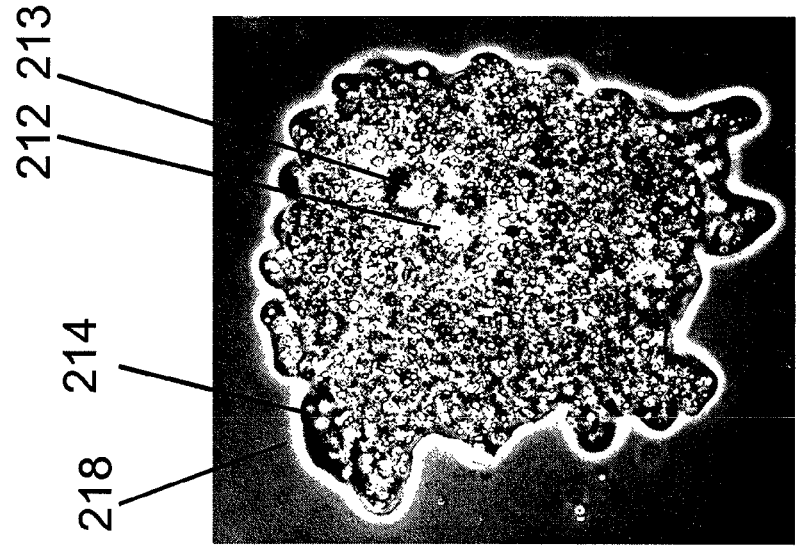
FIG. 2B is a phase contrast image of an amoeba obtained using a conventional phase contrast microscope.
Figure 2A:
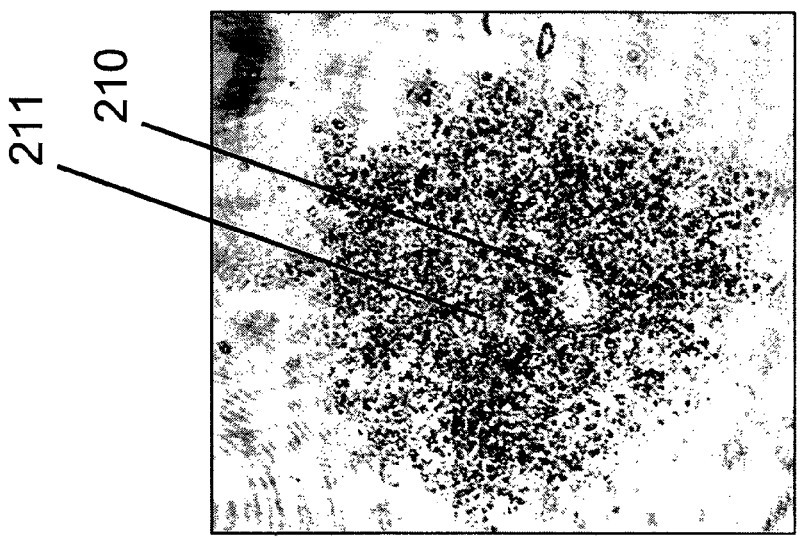
FIG. 2A is an image of an amoeba obtained using the system of FIG. 1A in bright-field microscopy mode (with low laser power), according to some embodiments of the invention.

FIG. 2A is a bright-field image of a spherical amoeba obtained using the system of FIG. 1A in bright-field mode, i.e., at a laser power low enough to not induce a phase transition in the liquid crystal. This bright-field image of the amoeba is a two dimensional structure with poorly defined edges, and its two larger organelles 210, 211 appear as clouded areas in the center of the specimen. FIG. 2B is a phase contrast image of a similar amoeba obtained using a conventional phase contrast microscope (Leitz Model SM-Lux). This image suggests a partly three dimensional view of the amoeba, and the nucleus 212 and contractile vacuole 213 are more visible than with bright-field microscopy, although they are not sharply focused. Features such as small internal organelles inside the cytoplasm, and edge 214, are more clearly seen than in the case of the bright-field microscopy image. FIG. 2C is a phase contrast image of the amoeba of FIG. 2A, obtained using the system of FIG. 1A in phase contrast imaging mode. The nucleus 215, contractile vacuole 216, and smaller organelles that move within the cytoplasm are clearly defined, and have a visible volume. The image also has a more three dimensional representation of the amoeba than does the conventional phase microscope image of FIG. 2B, for example, showing multiple pseudopodia 217 at varying depth and in good focus. Phase halos 218, which are one of the drawbacks of a standard phase contrast microscope, can be clearly seen as white outline in FIG. 2B, but are absent in FIG. 2C.

Figures 3A, 3B, 3C:
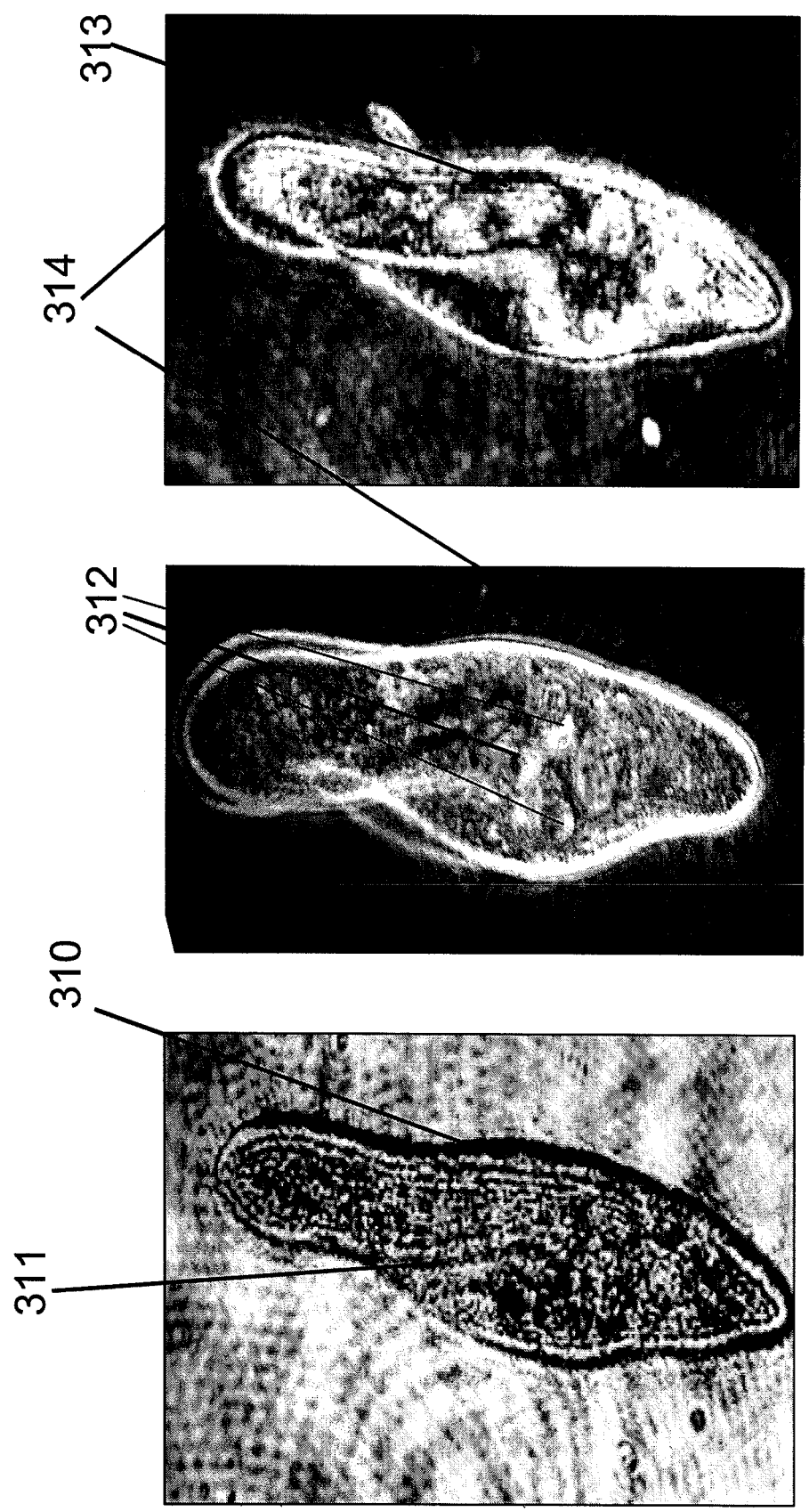
FIG. 3A is an image of a live paramecium obtained using the system of FIG. 1A in bright-field microscopy mode, according to some embodiments of the invention.
FIG. 3B is a phase contrast image of a live paramecium obtained using a conventional phase contrast microscope.
FIG. 3C is a phase contrast image of the live paramecium of FIG. 3A obtained using the system of FIG. 1A in Fourier phase contrast imaging mode, according to some embodiments of the invention.

FIGS. 3A-3C are images of paramecia, which, like amoebae, are difficult to image using conventional methods because they are they are substantially transparent and also frequently move. These unicellular microorganisms belong to the protoctist phylum Ciliophora. Members of this phylum (ciliates) are characterized by their cigar or slipper shape and external covering of continuously beating, hair-like cilia. These fine structures in particular are not always easy to visualize with bright-field microscopy unless the rest of the specimen is out of focus. Shapes of some of the internal organelles such as a pumping star shaped structure which constantly expands, contracts, disappears and appears, are typically available only for couple of seconds to take a clear image.

FIG. 3A is a bright-field image of a paramecium obtained using the system of FIG. 1A in bright-field mode, i.e., using a laser power low enough to not induce a phase transition in the liquid crystal. The image shows the distinguishing outline 310 and oral groove 311 of the paramecium, but not much else. FIG. 3B is a phase contrast of a similar paramecium obtained using the conventional phase contrast microscope of FIG. 2B. Details of internal organs 312 can be clearly observed in commercial phase contrast microscope image. FIG. 3C is a phase contrast image of the paramecium of FIG. 3A, obtained using the system of FIG. 1A in phase contrast imaging mode. The outline 313 of the paramecium is identifiable, and the external fine hair-like structures called cilia 314 can be seen. The feeding structure, the oral groove, and other internal structures are visible in greater detail as compared to FIG. 3B.

Figure 4B:
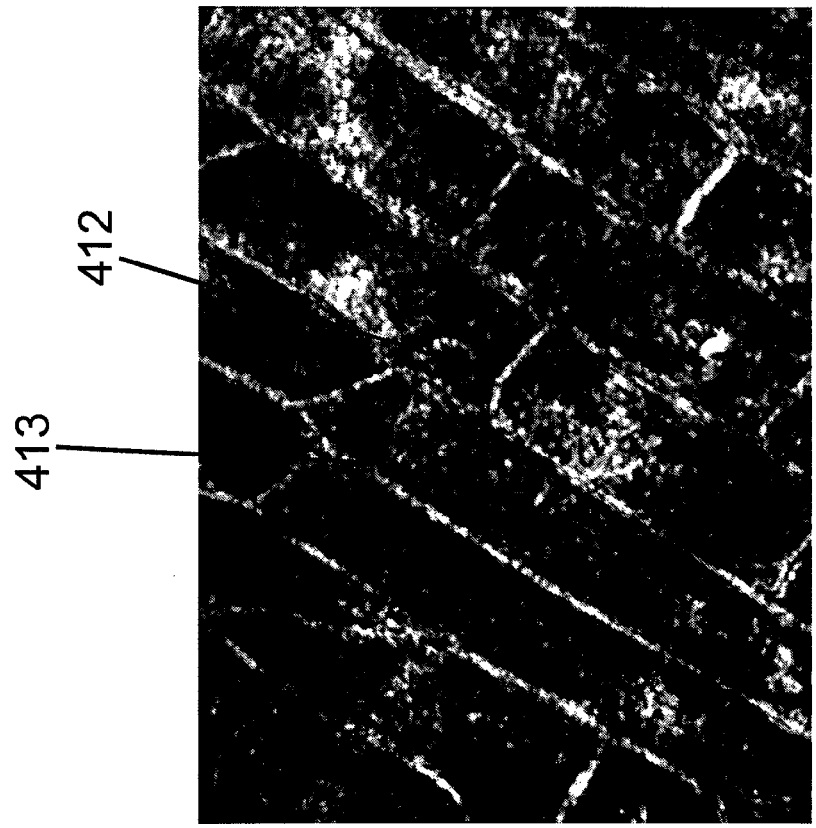
FIG. 4B is an image of the onion cells of FIG. 4A obtained using the system of FIG. 1A in Fourier phase contrast imaging mode, according to some embodiments of the invention.
Figure 4A:
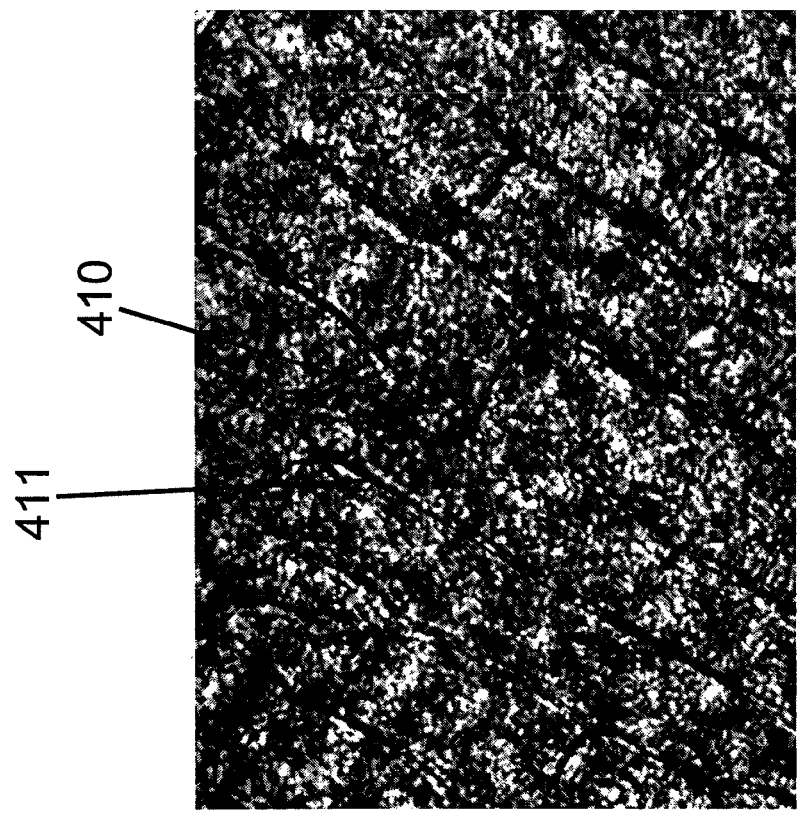
FIG. 4A is an image of onion cells in a scattering medium obtained using the system of FIG. 1 in bright-field microscopy mode, according to some embodiments of the invention.

The system of FIG. 1A can also be used to image a phase object in a scattering medium. FIGS. 4A and 4B are images of translucent onion cells from the skin (peel) of an onion bulb, in a scattering medium. The onion skin was placed in a 2 mm glass cuvette filled with uniform mixture of 100 ml of water and 3 ml of Intralipid. Intralipid is widely used in optical experiments to simulate the scattering properties of biological tissues. Solutions of appropriate concentrations of intralipid can be prepared that closely mimic the response of human or animal tissue to light at wavelengths in the red and infrared ranges, where tissue is highly scattering but has a rather low absorption coefficient. Kabivitrum Inc., California and Stockholm is a source of Intralipid; there are also other brands (Nutralipid™ (Pharmicia, Quebec), Liposyn™ (Abbot Labs, Montreal)) that can be used. Conventionally, solutions of distilled water and Intralipid are used as scattering media for biomedical imaging applications. The mixture simulates the tissue environment and matches optical parameters like absorption coefficient, scattering coefficient and the anisotropy coefficient (mean cosine of the scattering angle). The reduced scattering coefficient of the solution is about 6/cm. FIG. 4A is a bright-field image of onion skin in the scattering medium, obtained using the system of FIG. 1A in bright-field imaging mode. The cell walls 411 are visible and a nucleus 410 is noticeable in the picture. FIG. 4B is a phase contrast image of the onion skin of FIG. 4A, obtained using the system of FIG. 1A in phase contrast imaging mode. FIG. 4B shows edges 413 of the cells with much better contrast and the nuclei 412 within are also clearly visible. A striking feature is that the edge effect is very noticeable in this image. It is not possible to obtain phase contrast images for this sample with a standard instrument as it uses an incoherent light source. The high order phase coherence of the coherent source preserves the phase of the scattering medium. However this information is lost when a conventional white light source (incoherent source) is used.

Figure 5C:
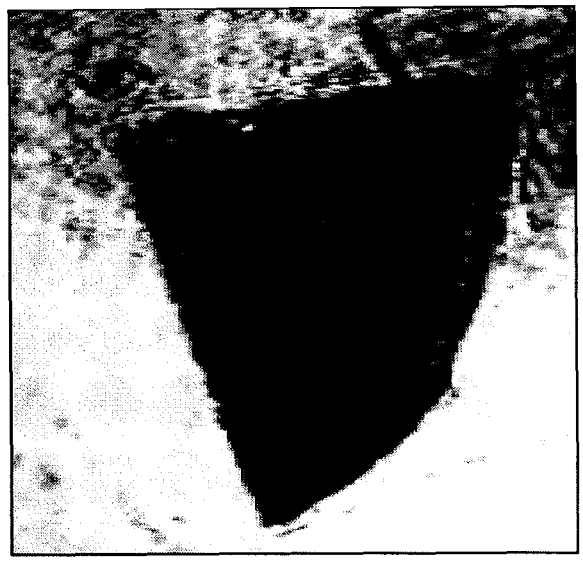
FIG. 5C is a negative phase-contrast image of the glass speck of FIG. 5A obtained using the system of FIG. 1A in Fourier phase contrast imaging mode, according to some embodiments of the invention.
Figure 5B:
FIG. 5B is an image of the glass speck of FIG. 5A obtained using the system of FIG. 1A in Fourier phase contrast imaging mode, according to some embodiments of the invention.
Figure 5A:
FIG. 5A is an image of a glass speck placed on a glass micro slide obtained using the system of FIG. 1A in bright-field microscopy mode, according to some embodiments of the invention.

Positive as well as negative phase contrast images can be achieved by simply varying the intensity of the laser light incident upon the sample. FIGS. 5A-5C are images of a small glass piece that is placed on a micro slide glass. Since the light has to travel through extra glass piece, it accumulates additional phase as it passes through. FIG. 5A is a bright field image of the glass piece, obtained using the system of FIG. 1A in bright-field imaging mode. Substantially only the edges 510 of the glass piece can be seen. In contrast, phase contrast images such as illustrated in FIGS. 5B and 5C show variations in optical phase resulting from transmission through the glass piece. FIG. 5B is a positive phase contrast image, obtained using the system of FIG. 1A in phase contrast imaging mode, FIG. 5C is negative phase contrast image obtained using the same system but using an incident intensity selected to provide a $-\pi/2$ phase shift between the light passing through the glass piece and the light not passing through the glass piece.

Although phase contrast imaging using 90° twisted nematic liquid crystals with azobenzene as an absorbing medium is described above, other liquid crystals and other absorbing dyes can also be used. For example, zinc 2,9,16,23-tetra-tentbutyl-29H,31H-phthalocyanine as an absorbing medium and similar phase contrast images were obtained when the 648 nm line of Ar—Kr laser is used as pump. Zinc phthalocyanines have an absorption peak around 677 nm and the liquid crystal cell is prepared in a similar manner as discussed earlier except that the two rubbed substrates are aligned 100 to each other. Broadband dyes can also be used, e.g., with a variety of light sources. Thus by selectively choosing the absorbing medium, the proposed technique can be used for any wavelength region. For instance 700 nm could be used because it is useful for in vivo imaging of tissue. Similarly, useful amounts of phase difference can be achieved by the right combination of birefringence and cell thickness as the phase shift accumulates with length of the birefringent material.

Figure 6:
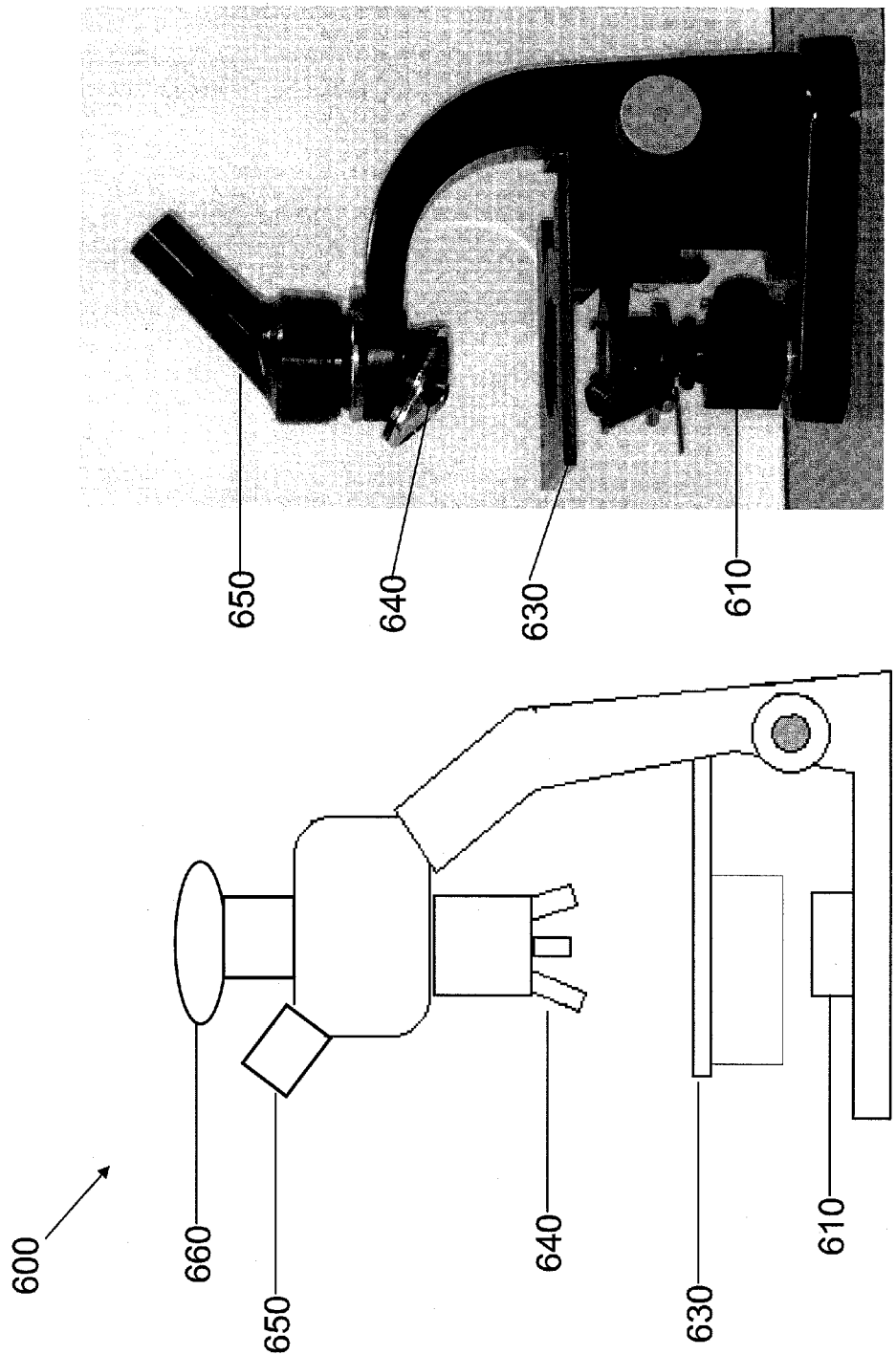
FIG. 6 is a schematic illustration of a conventional ordinary microscope.

System arrangements other than those described above can be used to provide phase contrast imaging using dye doped liquid crystals. For example, otherwise conventional microscopes can be modified to have phase contrast imaging capability. FIG. 6 includes a schematic illustration of a conventional microscope 600, along with a photograph of an actual conventional microscope. The microscope includes a white light source 610, a specimen stage 630, a lens (not shown) between the white light source and the specimen stage, a set of interchangeable objective lenses 640, an eyepiece 650, and a CCD camera 660.

Figure 7:
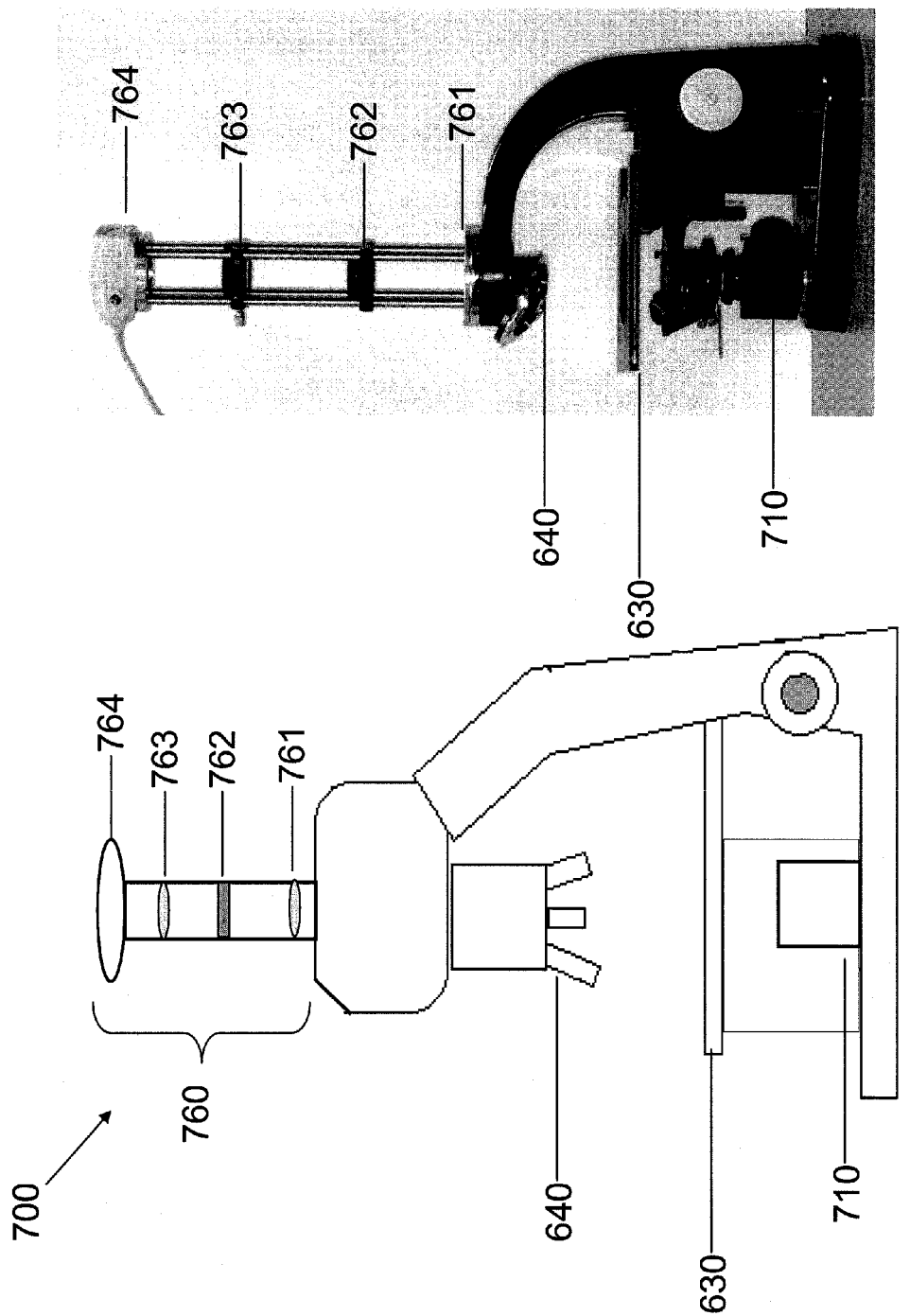
FIG. 7 is a schematic illustration of a microscope that is modified to perform phase contrast microscopy, according to some embodiments of the invention.

FIG. 7 includes a schematic illustration, as well as a photograph, of a microscope 700 that includes some of the conventional components of the microscope of FIG. 6, but performs phase contrast microscopy. Microscope 700 includes specimen stage 630 and a set of interchangeable objective lenses 640, but, instead of a white light source, includes a collimated laser source 710, e.g., a diode laser coupled to a fiber collimator. Microscope 700 also includes a phase contrast imaging assembly 760 that attaches to the body of the conventional microscope, e.g., in place of CCD 660. Assembly 760 includes Fourier transform lens 761, dye doped liquid crystal cell 762, Fourier transform lens 763, and CCD array 764. In operation, an objective selected from interchangeable objective lenses 640 performs an equivalent function to objective 155 in FIG. 1A, i.e., the objective collects light from an object on specimen holder 630. Fourier transform lens 761 Fourier transforms the collected light, and the resulting Fourier plane is inside of liquid crystal cell 762, which modifies the relative phases of the transformed light, as described in greater detail above. Fourier transform lens 764 performs an inverse Fourier transform on the light, and images the light onto the CCD 764, thus generating a phase contrast image of the object. CCD 764 is in communication with a processor (not shown) that stores (e.g., in an image store, or a computer-readable medium) or otherwise manipulates the image obtained by CCD 764 (see above). For example, the processor is in communication with a display device (not shown) on which it displays the resulting phase-contrast image of the object.

The systems and methods described above can further be modified to include additional functionalities, e.g., that may be complementary to phase contrast imaging. For example, the systems and methods can be adapted to perform other kinds of optical microscopy, such as fluorescence imaging. In contrast to phase contrast microscopy, fluorescence microscopy is capable of imaging the distribution of a single molecular species based on the properties of its fluorescence emission. Thus, using fluorescence microscopy, the precise location of intracellular components labeled with specific fluorophores can be monitored, for example. Addition of fluorescence imaging capability to a phase contrast microscope allows the system to provide both structural and functional information.

Figure 8:
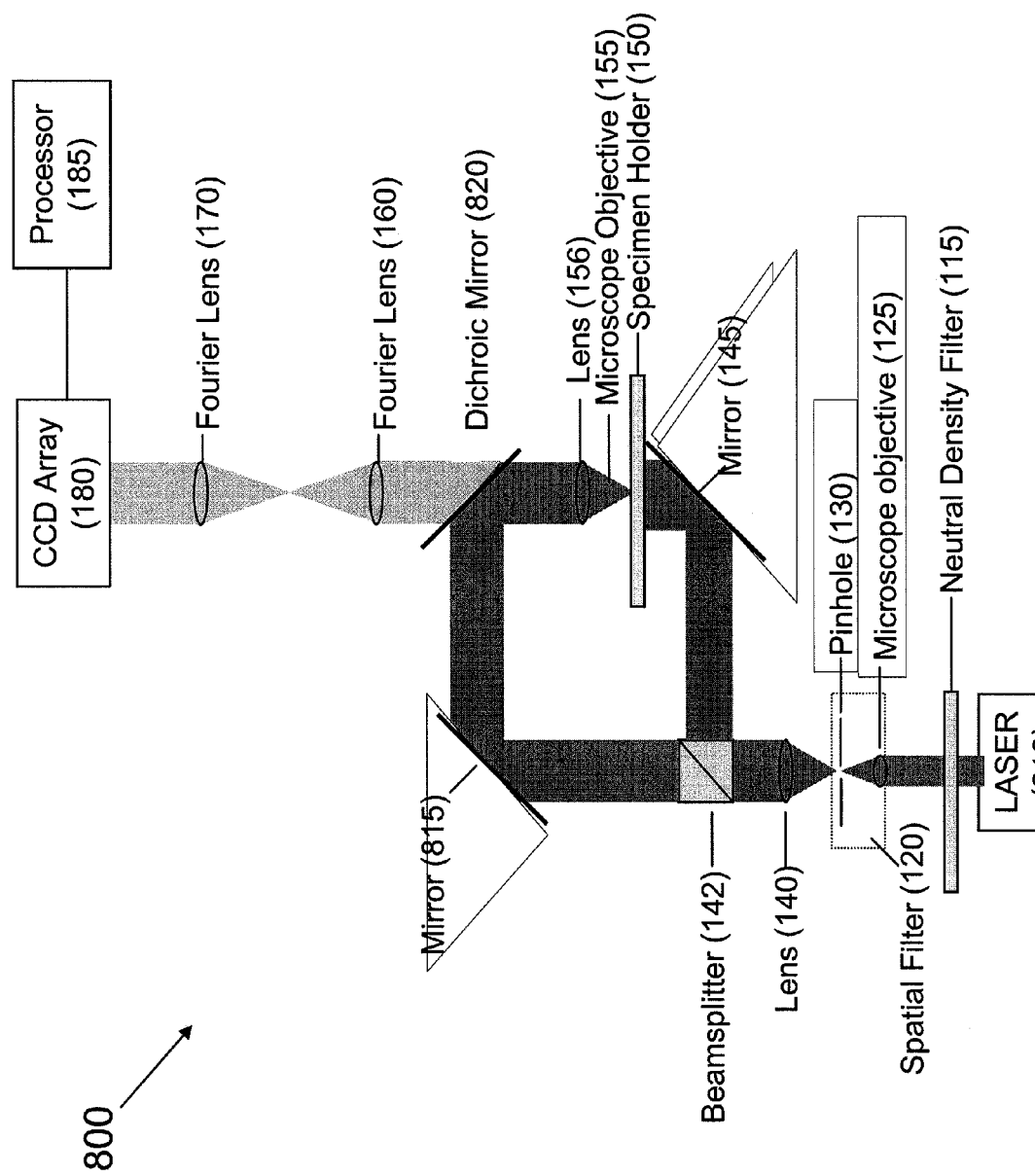
FIG. 8 is a schematic illustration of the system of FIG. 1A that has been modified to further provide perform fluorescence imaging of a sample, according to some embodiments.

FIG. 8 illustrates a system 800 that can perform both phase contrast imaging and fluorescence imaging. System 800 is similar in many respects to the system illustrated in FIG. 1A, and the same components are numbered with like numbers. System 800 uses a coherent laser source 810, which can be the same or different from the laser source 110 used for phase contrast microscopy. In one example, the laser source is the same, but is tuned to a wavelength that excites a selected fluorophore in the object to be imaged.

In the illustrated embodiment, signal is obtained from the same side at which the object is irradiated, e.g., in an epi-illumination configuration. In this configuration, system 800 includes a mirror 815 that directs light transmitted by beamsplitter 142 towards dichroic mirror 820. Dichroic mirror directs light through microscope objective 155 to irradiate the object on the specimen holder 155. Fluorescent emission from the object is then captured by microscope objective 155, and transmits through dichroic mirror 820. The emission is then imaged by Fourier lenses 160 and 170 onto CCD array 180. As above, CCD array 180 is in communication with a processor 185 that stores (e.g., in an image store, or a computer-readable medium) or otherwise manipulates the image obtained by CCD array 180 (see above). For example, the processor 185 is in communication with a display device (not shown) on which it displays the resulting phase-contrast image of the object. The CCD array and/or processor may have multi-modal imaging capability.

While the invention has been described in connection with specific methods and apparatus, those skilled in the art will recognize other equivalents to the specific embodiments herein. It is to be understood that the description is by way of example and not as a limitation to the scope of the invention and these equivalents are intended to be encompassed by the claims set forth below.

What is claimed is:

1. An assembly for converting a microscope into a phase contrast microscope, the microscope comprising a microscope objective and a specimen stage, wherein the microscope objective is constructed and arranged to collect coherent light from a coherent light source directed toward the specimen stage, the assembly comprising:

a first optical Fourier element that Fourier transforms light from the coherent light source, wherein the Fourier transform occurs in a Fourier plane;

a cell in the Fourier plane arranged to receive light from the first optical Fourier element, wherein the cell comprises liquid crystal molecules having a phase transition temperature, and wherein at temperatures exceeding the phase transition temperature, light transmitting through the liquid crystal molecules obtains a different phase than light transmitting through the liquid crystal molecules at temperatures below the phase transition temperature;

a second optical Fourier element arranged to receive light from the cell and inversely Fourier transform the received light to provide an image;

an image sensor that detects the image and generates an electronic representation of the image; and an adaptor capable of coupling the first and second Fourier elements, the cell, and the image sensor to the microscope such that the first Fourier element Fourier transforms light collected by the microscope objective.

2. The assembly of claim 1, wherein the microscope comprises at least one of a brightfield and an ordinary microscope.

3. The assembly of claim 1, comprising an optical element configured and arranged to adjust the light intensity to a level at which part of the transformed light has an intensity sufficient to heat a portion of the liquid crystal molecules above the phase transition temperature.

4. The assembly of claim 3, wherein the optical element selected to adjust the light intensity comprises a neutral density filter.

5. The assembly of claim 3, wherein the optical element is configured and arranged to adjust the light intensity to a level at which a portion of the transformed light transmits through the cell with a phase that is delayed relative to a second portion of the transformed light by one of about $\pi/2$ and about $-\pi/2$.

6. The assembly of claim 5, wherein the portion of the transformed light that is phase delayed corresponds to low spatial frequencies, and wherein the second portion of the transformed light corresponds to spatial frequencies that are higher than the portion that is phase delayed and also has a lower intensity than does the portion that is phase delayed.

7. The assembly of claim 3, wherein the optical element is further configured and arranged to adjust the light to an intensity such that it does not damage a living organism placed in a sample area.

8. The assembly of claim 1, wherein the first and second optical Fourier elements comprise lenses.

9. The assembly of claim 1, wherein the image sensor comprises a charge coupled device (CCD).

10. The assembly of claim 1, further comprising a polarizer positioned between the second optical Fourier element and the image sensor, the polarizer being rotatable to a position selected to eliminate at least a part of the information about a sample area from the image.

11. The assembly of claim 1, further comprising an optical element to direct at least a part of the light toward a fluorescence imaging system.

12. The assembly of claim 11, wherein the optical element is a dichroic mirror.

13. The assembly of claim 1, wherein at temperatures below the phase transition temperature, the liquid crystal molecules are birefringent, and wherein at temperatures above the phase transition temperature, the liquid crystal molecules are isotropic.

14. The assembly of claim 13, wherein the light has a predominant polarization, and wherein the liquid crystal cell is oriented at about 45 degrees to the predominant polarization.

15. The assembly of claim 1, wherein the liquid crystals in the cell further comprises dye molecules selected to at least partially absorb the light, and wherein at least partial absorption of the light by a portion of the dye molecules heats the part of the liquid crystal molecules above the phase transition temperature.

16. The assembly of claim 1, wherein below the phase transition temperature, the liquid crystal molecules are in an aligned nematic phase.

17. The assembly of claim 1, wherein the coherent light source comprises one of a continuous-wave laser and a diode.

18. The assembly of claim 1, wherein the liquid crystal cell is passive, in that no voltage is applied to the cell.

19. An assembly for converting a microscope into a multi-modal microscope, the microscope comprising a microscope objective and a specimen stage, wherein the microscope objective is constructed and arranged to collect coherent light from a coherent light source directed toward the specimen stage, the assembly comprising:
 a first optical Fourier element that Fourier transforms light from the coherent light source, wherein the Fourier transform occurs in a Fourier plane;
 a cell in the Fourier plane arranged to receive light from the first optical Fourier element, wherein the cell comprises liquid crystal molecules having a phase transition temperature, and wherein at temperatures exceeding the phase transition temperature, light transmitting through the liquid crystal molecules obtains a different phase than light transmitting through the liquid crystal molecules at temperatures below the phase transition temperature;
 a second optical Fourier element arranged to receive light from the cell and inversely Fourier transform the received light to provide an image;
 an image sensor that detects the image and generates an electronic representation of the image;
 an optical element to direct at least a part of the light toward a fluorescence imaging system; and
 an adaptor capable of coupling the first and second Fourier elements, the cell, the image sensor and the optical element to the microscope such that the first Fourier element Fourier transforms light collected by the microscope objective.

20. The assembly of claim 19, wherein the optical element is a dichroic mirror.

21. The assembly of claim 20, wherein modes of the multi-modal microscope comprise one of at least phase contrast microscopy and fluorescence microscopy.

22. The assembly of claim 19, wherein the coherent light source comprises one of a continuous-wave laser and a diode.

23. A method for converting a microscope into a phase contrast microscope, the microscope comprising a microscope objective and a specimen stage, wherein the microscope objective is constructed and arranged to collect coherent light from a coherent light source directed toward the specimen stage, the method comprising:
 providing the microscope; and
 coupling a phase contrast assembly to the microscope, the phase contrast assembly comprising:
  a first optical Fourier element for Fourier transforming light from the coherent light source, wherein the Fourier transforming occurs in a Fourier plane;
  a cell in the Fourier plane arranged for receiving light from the first optical Fourier element, wherein the cell comprises liquid crystal molecules having a phase transition temperature, and wherein at temperatures exceeding the phase transition temperature, light transmitting through the liquid crystal molecules obtains a different phase than light transmitting through the liquid crystal molecules at temperatures below the phase transition temperature;
  a second optical Fourier element arranged for receiving light from the cell and inversely Fourier transforming the received light to provide an image;
  an image sensor for detecting the image and generating an electronic representation of the image; and
  an adaptor capable of coupling the first and second Fourier elements, the cell, and the image sensor to the microscope such that the first Fourier element Fourier transforms light collected by the microscope objective.

24. The method of claim 23, wherein the phase contrast assembly comprises an optical element for directing at least a part of the light toward a fluorescence imaging system.

25. The method of claim 24, wherein the optical element is a dichroic mirror.

26. The method of claim 23, wherein the coherent light source comprises one of a continuous-wave laser and a diode.

27. The method of claim 25, wherein the image sensor comprises a CCD.

28. A method for converting a microscope into a multi-modal microscope, the microscope comprising a microscope objective and a specimen stage, wherein the microscope objective is constructed and arranged to collect coherent light from a coherent light source directed toward the specimen stage, the method comprising:
 providing the microscope; and
 coupling a multi-modal assembly to the microscope, the multi-modal assembly comprising:
  a first optical Fourier element that Fourier transforms light from the coherent light source, wherein the Fourier transform occurs in a Fourier plane;
  a cell in the Fourier plane arranged to receive light from the first optical Fourier element, wherein the cell comprises liquid crystal molecules having a phase transition temperature, and wherein at temperatures exceeding the phase transition temperature, light transmitting through the liquid crystal molecules obtains a different phase than light transmitting through the liquid crystal molecules at temperatures below the phase transition temperature;
  a second optical Fourier element arranged to receive light from the cell and inversely Fourier transform the received light to provide an image;
  an image sensor that detects the image and generates an electronic representation of the image;
  an optical element to direct at least a part of the light toward a fluorescence imaging system; and
  an adaptor capable of coupling the first and second Fourier elements, the cell, the image sensor and an optical element to the microscope such that the first Fourier element Fourier transforms light collected by the microscope objective.

29. The method of claim 28, wherein the optical element is a dichroic mirror.

30. The method of claim 28, wherein modes of the multi-modal microscope comprise one of phase contrast microscopy and fluorescence microscopy.

31. The method of claim 28, wherein the coherent light source comprises one of a continuous-wave laser and a diode.

32. A system for converting a microscope into a phase contrast microscope, the microscope comprising a microscope objective and a specimen stage, wherein the microscope objective is constructed and arranged to collect coherent light directed toward the specimen stage, the system comprising:
- a coherent light source; and
- a phase contrast assembly comprising:
    - a first optical Fourier element that Fourier transforms light from the coherent light source, wherein the Fourier transform occurs in a Fourier plane;
    - a cell in the Fourier plane arranged to receive light from the first optical Fourier element, wherein the cell comprises liquid crystal molecules having a phase transition temperature, and wherein at temperatures exceeding the phase transition temperature, light transmitting through the liquid crystal molecules obtains a different phase than light transmitting through the liquid crystal molecules at temperatures below the phase transition temperature;
    - a second optical Fourier element arranged to receive light from the cell and inversely Fourier transform the received light to provide an image;
    - an image sensor that detects the image and generates an electronic representation of the image; and
    - an adaptor capable of coupling the first and second Fourier elements, the cell, and the image sensor to the microscope such that the first Fourier element Fourier transforms light collected by the microscope objective.

33. The system of claim 32, wherein the phase contrast assembly comprises an optical element to direct at least a part of the light toward a fluorescence imaging system.

34. The system of claim 33, wherein the optical element is a dichroic mirror.

35. The system of claim 32, wherein the coherent light source comprises a continuous-wave laser and a diode.

36. A system for converting a microscope into a multi-modal microscope, the microscope comprising a microscope objective and a specimen stage, wherein the microscope objective is constructed and arranged to collect coherent light directed toward the specimen stage, the system comprising:
- a coherent light source; and
- a multi-modal assembly comprising:
    - a first optical Fourier element that Fourier transforms light from the coherent light source, wherein the Fourier transform occurs in a Fourier plane;
    - a cell in the Fourier plane arranged to receive light from the first optical Fourier element, wherein the cell comprises liquid crystal molecules having a phase transition temperature, and wherein at temperatures exceeding the phase transition temperature, light transmitting through the liquid crystal molecules obtains a different phase than light transmitting through the liquid crystal molecules at temperatures below the phase transition temperature;
    - a second optical Fourier element arranged to receive light from the cell and inversely Fourier transform the received light to provide an image;
    - an image sensor that detects the image and generates an electronic representation of the image;
    - an optical element to direct at least a part of the light toward a fluorescence imaging system; and
    - an adaptor capable of coupling the first and second Fourier elements, the cell, the image sensor and the optical element to the microscope such that the first Fourier element Fourier transforms light collected by the microscope objective.

37. The system of claim 36, wherein the optical element is a dichroic mirror.

38. The system of claim 37, wherein modes of the multi-modal microscope comprise one of at least phase contrast microscopy and fluorescence microscopy.

39. The system of claim 36, wherein the coherent light source comprises one of a continuous-wave laser and a diode.

* * * * *